US008823487B2

(12) United States Patent
Duenne et al.

(10) Patent No.: US 8,823,487 B2
(45) Date of Patent: Sep. 2, 2014

(54) CLEANING APPARATUS AND METHOD FOR CONTROLLING ACCESS TO A CLEANING APPARATUS

(75) Inventors: Markus Duenne, Winnenden (DE); Christian Hofner, Welzheim (DE); Juergen Walz, Moeckmuehl (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 206 days.

(21) Appl. No.: 13/330,743

(22) Filed: Dec. 20, 2011

(65) Prior Publication Data

US 2012/0154116 A1 Jun. 21, 2012

Related U.S. Application Data

(63) Continuation of application No. PCT/EP2010/059875, filed on Jul. 9, 2010.

(30) Foreign Application Priority Data

Jul. 14, 2009 (DE) ......................... 10 2009 033 944

(51) Int. Cl.
*G05B 19/00* (2006.01)
*G05B 23/00* (2006.01)
*A47L 11/00* (2006.01)
*A47L 13/00* (2006.01)
*A47L 1/02* (2006.01)

(52) U.S. Cl.
USPC ........... 340/5.65; 340/5.8; 340/5.81; 15/52.1; 15/49.1; 15/50.1; 15/98

(58) Field of Classification Search
USPC .......................................................... 713/171
See application file for complete search history.

(56) References Cited

U.S. PATENT DOCUMENTS 4,173,858 A 11/1979 Cassia
4,351,078 A 9/1982 Sternberg (Continued)

FOREIGN PATENT DOCUMENTS

AT 397 030 1/1994
DE 33 09 967 9/1984

(Continued)

OTHER PUBLICATIONS

*Patent Abstracts of Japan*, Abstract of Japanese Patent "Tire Wear Detecting Device and Method", Publication No. 2006151269, Jun. 15, 2006, Japanese Application No. 2004346910, Filed Nov. 30, 2004.

*Primary Examiner* — Jennifer Mehmood
*Assistant Examiner* — Pameshanand Mahase
(74) *Attorney, Agent, or Firm* — Lipsitz & McAllister, LLC

(57) ABSTRACT

The invention relates to a cleaning apparatus, comprising an operating unit for operating the cleaning apparatus, at least one functional unit for carrying out an operating instruction, and a control unit for receiving operating instructions performed on the operating unit and controlling the at least one functional unit based on said operating instructions, wherein an access authorization stored on an authorization carrier is required in order to operate the cleaning apparatus. In order to provide such a cleaning apparatus with a more user-friendly access control, it is proposed that the cleaning apparatus have a detection unit operatively connected to the control unit and configured for contactless detection of the access authorization and transmission thereof to the control unit, and that the access authorization be verifiable for its validity by the control unit. The invention further relates to a method for controlling access to a cleaning apparatus.

26 Claims, 3 Drawing Sheets

(56) References Cited

U.S. PATENT DOCUMENTS

| | | | | |
|---|---|---|---|---|
| 4,679,271 | A | 7/1987 | Field et al. | |
| 4,846,236 | A | 7/1989 | Deruntz | |
| 5,174,730 | A | 12/1992 | Nieuwkamp et al. | |
| 5,421,489 | A | 6/1995 | Holzner, Sr. et al. | |
| 5,455,979 | A | 10/1995 | Bores et al. | |
| 5,615,437 | A | 4/1997 | Takahashi et al. | |
| 5,640,081 | A | 6/1997 | Austin et al. | |
| 5,735,620 | A | 4/1998 | Ford | |
| 5,922,968 | A | 7/1999 | Briscoe | |
| 5,940,928 | A | 8/1999 | Erko | |
| 6,006,388 | A | 12/1999 | Young | |
| 6,095,370 | A | 8/2000 | Rhine et al. | |
| 6,123,122 | A | 9/2000 | Dushman | |
| 6,142,750 | A | 11/2000 | Benecke | |
| 6,163,915 | A | 12/2000 | Kaczmarz et al. | |
| 6,493,896 | B1 | 12/2002 | Stuchlik et al. | |
| 6,971,549 | B2 | 12/2005 | Leifheit et al. | |
| 7,120,961 | B2 | 10/2006 | Boomgaarden et al. | |
| 7,269,877 | B2 | 9/2007 | Tondra et al. | |
| 7,992,245 | B2 | 8/2011 | Schuetz et al. | |
| 8,011,050 | B2 | 9/2011 | Knopow | |
| 8,015,650 | B2 | 9/2011 | Knopow et al. | |
| 2003/0043039 | A1 | 3/2003 | Salemi et al. | |
| 2004/0045581 | A1 | 3/2004 | Boomgaarden et al. | |
| 2005/0110639 | A1 * | 5/2005 | Puzio et al. | 340/572.1 |
| 2006/0069463 | A1 | 3/2006 | Kim | |
| 2006/0103523 | A1 * | 5/2006 | Field | 340/540 |
| 2006/0265824 | A1 | 11/2006 | Knopow | |
| 2007/0020040 | A1 | 1/2007 | Sacks | |
| 2007/0252719 | A1 | 11/2007 | Ray | |
| 2008/0047092 | A1 | 2/2008 | Schnittman et al. | |
| 2008/0073375 | A1 | 3/2008 | Nelson et al. | |
| 2008/0099045 | A1 | 5/2008 | Glenn et al. | |
| 2008/0136664 | A1 * | 6/2008 | Elsasser et al. | 340/825.22 |
| 2008/0178909 | A1 | 7/2008 | Alvestig et al. | |
| 2008/0218312 | A1 * | 9/2008 | Asher et al. | 340/10.1 |
| 2008/0276969 | A1 | 11/2008 | Vanantwerp et al. | |
| 2009/0058617 | A1 * | 3/2009 | Wu et al. | 340/10.41 |
| 2010/0011212 | A1 * | 1/2010 | Anemikos et al. | 713/171 |
| 2010/0045423 | A1 * | 2/2010 | Glickman et al. | 340/5.1 |
| 2010/0263141 | A1 | 10/2010 | Schuetz et al. | |
| 2010/0325826 | A1 | 12/2010 | Knopow et al. | |
| 2011/0023918 | A1 | 2/2011 | Kelle et al. | |

FOREIGN PATENT DOCUMENTS

| | | |
|---|---|---|
| DE | 87 16 072 | 2/1988 |
| DE | 38 41 177 | 11/1990 |
| DE | 91 04 336 | 7/1991 |
| DE | 94 01 950 | 3/1994 |
| DE | 195 06 552 | 9/1995 |
| DE | 195 21 536 | 12/1996 |
| DE | 696 08 116 | 1/2001 |
| DE | 20 2004 019 888 | 3/2005 |
| DE | 10 2004 022 359 | 11/2005 |
| DE | 601 11 306 | 3/2006 |
| DE | 10 2005 041 598 | 1/2007 |
| DE | 699 37 015 | 5/2008 |
| DE | 60 2005 004 218 | 1/2009 |
| DE | 10 2007 050 351 | 4/2009 |
| DE | 10 2008 009 221 | 8/2009 |
| EP | 0 504 568 | 9/1992 |
| EP | 0 444 031 | 1/1994 |
| EP | 0 649 626 | 4/1995 |
| EP | 0 844 030 | 5/1998 |
| EP | 1 118 300 | 7/2001 |
| EP | 1 927 408 | 6/2008 |
| GB | 2 022 994 | 12/1979 |
| JP | 2000217759 | 8/2000 |
| JP | 2000342496 | 12/2000 |
| WO | 97/08984 | 3/1997 |
| WO | 2007/143214 | 12/2007 |
| WO | 2009/049699 | 4/2009 |

* cited by examiner

CLEANING APPARATUS AND METHOD FOR CONTROLLING ACCESS TO A CLEANING APPARATUS

This application is a continuation of international application number PCT/EP2010/059875 filed on Jul. 9, 2010 and claims the benefit of German application No. 10 2009 033 944.2 of Jul. 14, 2009.

The present disclosure relates to the subject matter disclosed in international application number PCT/EP2010/059875 of Jul. 9, 2010 and German application No. 10 2009 033 944.2 of Jul. 14, 2009, which are incorporated herein by reference in their entirety and for all purposes.

BACKGROUND OF THE INVENTION

The invention relates to a cleaning apparatus, comprising an operating unit for operating the cleaning apparatus, at least one functional unit for carrying out an operating instruction, and a control unit for receiving operating instructions performed on the operating unit and controlling the at least one functional unit based on said operating instructions, wherein an access authorization stored on an authorization carrier is required in order to operate the cleaning apparatus.

The invention further relates to a method for controlling access to a cleaning apparatus, wherein the cleaning apparatus comprises an operating unit for operating the cleaning apparatus, at least one functional unit for carrying out an operating instruction, and a control unit for receiving operating instructions performed on the operating unit and controlling the at least one functional unit based on said operating instructions, and wherein an access authorization stored on an authorization carrier is required in order to operate the cleaning apparatus.

In a cleaning apparatus of the type mentioned at the outset, access is controlled on the basis of an authorization carrier, for example in the form of a key, which has an access authorization stored thereon. Access is controlled in order to ensure that only an authorized and instructed user operates the cleaning apparatus. In this way, operating errors and an associated risk of damage not only to the cleaning apparatus but also to the operator or third parties are to be avoided. Examples of cleaning apparatuses the operation of which requires access authorization include scrubber vacuum machines, mobile sweeper machines, both designed as what are known as walk-behind machines, in which the user controls the machine from behind, as well as ride-on machines. Furthermore, by way of example, cleaning apparatuses using a cleaning jet also exist that require access authorization in order to operate. These include high-pressure cleaning apparatuses, in particular heatable high-pressure cleaners, or particle blasting apparatuses, in particular dry ice blasters.

According to the above-mentioned examples, the at least one functional unit may take a variety of forms. The functional unit may, for example, be a cleaning tool, in particular a brush tool, a dirt pickup device, a drive device, a pressure generating device, a cleaning agent metering device, etc.

It is an object of the present invention to provide a cleaning apparatus of the type mentioned at the outset and a method for controlling access to a cleaning apparatus of the type mentioned at the outset which allow more user-friendly access control.

SUMMARY OF THE INVENTION

In accordance with the invention, this object is achieved in a cleaning apparatus of the generic type by the cleaning apparatus having a detection unit operatively connected to the control unit and configured for contactless detection of the access authorization and transmission thereof to the control unit, and by the access authorization being verifiable for its validity by means of the control unit.

The cleaning apparatus in accordance with the invention uses a detection unit which is adapted to detect in a contactless manner the access authorization stored on the authorization carrier. The access authorization detected in a contactless manner is transmitted to the control unit, by which it is verified in terms of its validity. The contactless access control proves more user-friendly for a user of the cleaning apparatus. In particular, it obviates the need for the access authorization to be detected mechanically by the cleaning apparatus, in particular on the basis of a key.

Preferably, the cleaning apparatus comprises a storage unit which is operatively connected to the control unit and in which information associated with the access authorization and related to the user is storable for associating the access authorization with a specific user by the control unit. Information related to the user is storable, and in particular storable so as to be modifiable, in the storage unit. Once the access authorization detected has been transmitted to the control unit, the latter can determine which user should be in possession of the access authorization based on the information stored in the storage unit. It is thus possible for the control unit to identify the user who is putting the cleaning apparatus into operation.

It may be provided for the information in the storage unit to be stored therein upon first-time operation of the cleaning apparatus. It is also possible to modify the information, in particular to add or delete information. Accordingly, user information for more than one access authorization may be created and modified, in particular added to or deleted from the storage unit.

It is advantageous for information associated with the access authorization and related to an authorization level of the user and/or an operating profile of the user for the cleaning apparatus to be storable in the storage unit. This provides the possibility of determining, by means of the control unit, which authorization level is associated with the access authorization detected. Different authorization levels for the cleaning apparatus may thus be provided, such as an authorization level that authorizes only cleaning operations and/or an authorization level that authorizes maintenance and servicing of the cleaning apparatus. It is also possible for the authorization levels to be graded, with the access authorization enabling only selected but not all of the functional units of the cleaning apparatus to be operated. Furthermore, this embodiment of the cleaning apparatus provides the possibility of reading from the storage unit an operating profile for the user based on the access authorization detected. On the basis of the operating profile determined, it is for example possible for the cleaning apparatus to adjust preferential user settings automatically prior to the actual cleaning operation. Thus, by way of example, an operating profile may store the information that the user associated with the access authorization is involved in cleaning only floors of a particular nature, allowing the cleaning apparatus to be preset in terms of a cleaning tool and dosage of cleaning liquid. It is also possible for status information relating to the cleaning apparatus to be displayed on a display device of the operating unit in a language familiar to the user.

It is advantageous for the detection unit to comprise a device for detecting the access authorization by electromagnetic radiation. The device, which may in particular be an electromagnetic radiation receiver device, allows the access authorization to be detected in a contactless manner. It is also possible for the device to be additionally configured as a transmitter device for emitting electromagnetic radiation and to be adapted to detect, for example on the basis of a modification, through an authorization carrier, of the radiation emitted by it, whether the modification takes place based on an access authorization stored in the authorization carrier.

Any type of radiation in the electromagnetic spectrum may be used as the electromagnetic radiation detectable by the device, in particular radiation in the short wave or ultrashort wave range, the microwave range, the infrared range or the visible spectrum range. In practice, it has proven useful for the device to be suitable for detecting radiation in the short wave and/or the ultrashort wave ranges.

It is also possible to use ultrasound in order to detect the access authorization by the detection unit.

Preferably, the device is configured as an RFID reading device. By means of the RFID reading device, an access authorization known as the "ID" (an identification code) stored on the authorization carrier can be detected by means of electromagnetic radiation. The RFID reading device preferably emits electromagnetic radiation, which undergoes modification based on the access authorization stored on the authorization carrier, said modification being detectable by the RFID reading device. The modification takes place as a function of the access authorization, thereby enabling the access authorization to be detected by the RFID reading device and to be then verified by the control unit.

In a different embodiment of the cleaning apparatus, it may be provided for the device to be configured as a passive RFID device which receives from an active type RFID device, namely an authorization carrier, the access authorization stored thereon and which detects said access authorization in this manner. It may further be provided for both the device and the authorization carrier to be active RFID devices.

It is advantageous for the device to form an NFC interface. The NFC (near field communication) interface is a standardized interface for a short-range transmission standard in which a connection can be established in an ad hoc manner, i.e. without prior exchange of mutual identification codes. On the one hand, this makes it possible for the access authorization to be detected by the detection unit only when the authorization carrier is at most a maximum distance away from the detection unit. This maximum distance being typically in the range of few centimeters, a user has to place the authorization carrier deliberately in close proximity to the cleaning apparatus for the latter to be put into operation. On the other hand, by utilizing the device as an NFD interface, the cleaning apparatus can be put into operation swiftly. The access authorization can be detected without the need for prior identification code exchange between the detection unit and the authorization carrier in order to establish a data connection. Finally, use of an NFC interface on the detection unit allows for NFC-enabled devices, in particular mobile phones or laptops, to be employed as authorization carriers. Additionally, further data exchange with external communication devices may take place via the NFC interface, and such data exchange need not necessarily be associated with detecting the access authorization.

It is advantageous for the cleaning apparatus to comprise at least one authorization carrier associated therewith and having an access authorization stored thereon. The authorization carrier may be used for operating the cleaning apparatus, as explained above. If the cleaning apparatus comprises a plurality of authorization carriers associated therewith, it is thus possible for a plurality of users to be granted access to the cleaning apparatus. Provision may be made for the access authorizations of different authorization carriers to differ in their authorization levels, with the different authorization levels related to the respective access authorization being stored in a storage unit of the cleaning apparatus.

In the presence of a plurality of cleaning apparatuses it may also be possible for one authorization carrier to give access to a plurality of cleaning apparatuses by means of the access authorization stored on it.

It is advantageous for the at least one authorization carrier to be configured as a transponder. A transponder is a device that can be used to detect an incoming electromagnetic signal and to emit an electromagnetic signal. For example, the incoming signal may be modified on the basis of the access authorization as it is emitted. This makes it possible to use the at least one authorization carrier in combination with a detection unit that comprises a device for detecting the access authorization by means of electromagnetic radiation. The transponder is in particular RFID-enabled and preferably suitable for communication with an NFC interface. The advantages explained above in the context of the description of the detection unit may thus be achieved by the use of such a transponder. The transponder may be an active or a passive transponder.

Preferably, the at least one authorization carrier has a storage member in which information associated with the access authorization and related to a specific user, in particular related to an authorization level of the user and/or an operating profile of the user for the cleaning apparatus is storable. It is thereby possible for an authorization level of the user and/or an operating profile to be detected after or along with detecting the access authorization by the detection unit. As explained above, the way the cleaning apparatus operates may thus be set prior to the actual cleaning operation and may in particular be adapted to the user. The use of such an authorization carrier is particularly advantageous when said authorization carrier grants access to more than only one cleaning apparatus. If information related to the user, in particular related to the user's authorization level and the user's operating profile, is stored on the at least one authorization carrier, the user can, by way of example, put into operation a plurality of cleaning apparatuses of the same type and identical settings. In this way, the user is saved the trouble of adjusting the respective settings of a cleaning apparatus.

It is advantageous for the cleaning apparatus to have a receptacle for the at least one authorization carrier. The at least one authorization carrier can be arranged in the receptacle and thereby assume a defined relative position with respect to the cleaning apparatus. In particular, the authorization carrier can be held within a defined distance of the detection unit, enabling reliable detection of the access authorization and, when present, further information stored on the authorization carrier and related to the user. Accordingly, "contactless detection" of the access authorization for the cleaning apparatus in accordance with the invention does not exclude the authorization carrier itself from coming into contact with the cleaning apparatus, in particular when it is adapted to be arranged in the receptacle.

It may be provided for the cleaning apparatus to comprise a securing device for releasably securing the at least one authorization carrier in the receptacle. The securing device is preferably configured as a clamping device.

It is advantageous for the receptacle to be arranged on the operating unit. A user putting the cleaning apparatus into operation typically goes to the operating unit; thus, the aforementioned arrangement provides a user-friendly way to put the cleaning apparatus into operation.

Preferably, the cleaning apparatus comprises an activating member, the detection unit being activatable by actuating said activating member. This makes it possible to switch the detection unit from a passive mode in which it is not designed to detect the access authorization to an active mode in which it is capable of detecting the access authorization. This eliminates the need for the detection unit to be permanently operated in active mode. The energy requirements of the cleaning apparatus can thereby be reduced.

It is advantageous for the activating member to be actuatable by at least one authorization carrier associated with the cleaning apparatus. It may in particular be provided for the activating member to be arranged on the above-described receptacle of the at least one authorization carrier and to be actuated when the at least one authorization carrier is being arranged in the receptacle. If this is the case, the detection unit is activated and transferred from passive mode to active mode in order to detect the access authorization stored on the at least one authorization carrier. Conversely, for the case of removing the at least one authorization carrier from the receptacle, provision may be made for the activating member to be actuated again and, as a precautionary measure, for the cleaning apparatus to be put out of operation by the control unit, in particular for the at least one functional unit to be deactivated and operating instructions performed on the operating unit to be ignored.

In order to prevent the detection unit from being permanently in active mode and ready to detect an access authorization, it may also be provided for the control unit to comprise a timing member for time-dependent output of an activating signal to the detection unit. The timing member may from time to time, and in particular periodically, output an activating signal which is provided for transmission to the detection unit. The detection unit can be activated by every activating signal in order to determine whether it can detect an access authorization. If it cannot, then the detection unit can return to passive mode.

As mentioned at the outset, the invention further relates to a method for controlling access to a cleaning apparatus. In accordance with the invention, the object mentioned at the outset is achieved in a method of the generic type in that, by a detection unit of the cleaning apparatus which is operatively connected to the control unit, an access authorization is detected in a contactless manner and is transmitted to the control unit, and in that the access authorization is verified for its validity by said control unit.

The advantages of the method in accordance with the invention have already been mentioned in the context of the description of the cleaning apparatus in accordance with the invention and can also be achieved by said method.

It is advantageous for a storage unit operatively connected to the control unit to be read, said storage unit storing information associated with the access authorization and related to a specific user, in particular related to an authorization level of the user and/or an operating profile of the user for the cleaning apparatus. This makes it possible to identify a specific user as a function of the access authorization, and in particular to read from the storage unit the user's authorization level and/or the user's operating profile for operating the cleaning apparatus. As has already been mentioned in the context of the description of the cleaning apparatus, this allows operation of the cleaning apparatus to be adapted to the user's authorization and requirements.

It is advantageous for the detection unit to be activated by actuating an activating member of the cleaning apparatus, thus eliminating the need for the detection unit to be permanently operated in active mode, in which it can detect the access authorization.

It is advantageous for the activating member to be actuated by means of the authorization carrier. This may be accomplished, for example, by arranging the authorization carrier in a receptacle associated therewith and provided on the cleaning apparatus which has the activating member arranged thereon.

Preferably, the access authorization stored on the authorization carrier is detected using a method that is based on an RFID technology. This provides a technically simple and reliable way of detecting the access authorization in a contactless manner by the detection unit. In particular, the detection unit may be operated as an RFID reading device and/or the authorization carrier may be operated as an active or passive RFID transponder.

It is advantageous for an NFC standard to be used as the transmission standard between the detection unit and the authorization carrier. The benefits of using an NFC standard that is based on RFID technology have already been mentioned in the context of the description of an embodiment of the cleaning apparatus in accordance with the invention in which the detection unit forms an NFC interface; therefore, reference is made to what has been described above.

It is advantageous if, following positive verification of the access authorization in terms of its validity, a data connection between the cleaning apparatus and an external communication device is allowed to be established as a function of the access authorization for maintenance of the cleaning apparatus. This enables maintenance work to be carried out on the cleaning apparatus once an access authorization detected by the detection unit has been positively verified in terms of its validity. In this process, it has been determined that the user holding the authorization carrier is authorized to perform maintenance work on the cleaning apparatus. Correspondingly, the required authorization level of the user associated with the access authorization may be stored in a storage unit of the cleaning apparatus and/or in a storage member of the authorization carrier. It is thus possible to permit maintenance work on the cleaning apparatus to be performed only after the user has identified himself/herself as a user who is authorized to carry out such maintenance work.

Preferably, the data connection between the cleaning apparatus and the communication device is established in a wireless manner using the detection unit. In this way, the detection unit not only serves to detect the access authorization but also defines a "maintenance interface" for the purpose of carrying out maintenance on the cleaning apparatus. A wireless and in particular electromagnetic radiation based data connection can be established via said interface. Said connection may, for example, be an NFC standard based connection, a connection using a Bluetooth standard, or a connection using WLAN standards. Establishing the wireless data connection using a Bluetooth standard or a WLAN standard has, for the case of maintenance, an advantage over the NFC standard in that the first-mentioned standards require an identification code to be exchanged between the detection unit and the external communication device for the data connection to be established, thus providing an additional security check. Furthermore, Bluetooth or WLAN technologies allow higher data transmission rates between the cleaning apparatus and the communication device than would be possible with NFC technology. Maintenance procedures may require large data volumes to be exchanged, for example when new or updated software needed for the operation of the cleaning apparatus has to be transferred thereto. On the other hand, an NFC based data connection is advantageous in its shorter range and faster establishment.

The following description of a preferred embodiment of the invention serves to explain the invention in greater detail in conjunction with the drawings.

DETAILED DESCRIPTION OF THE INVENTION

Figure 1:
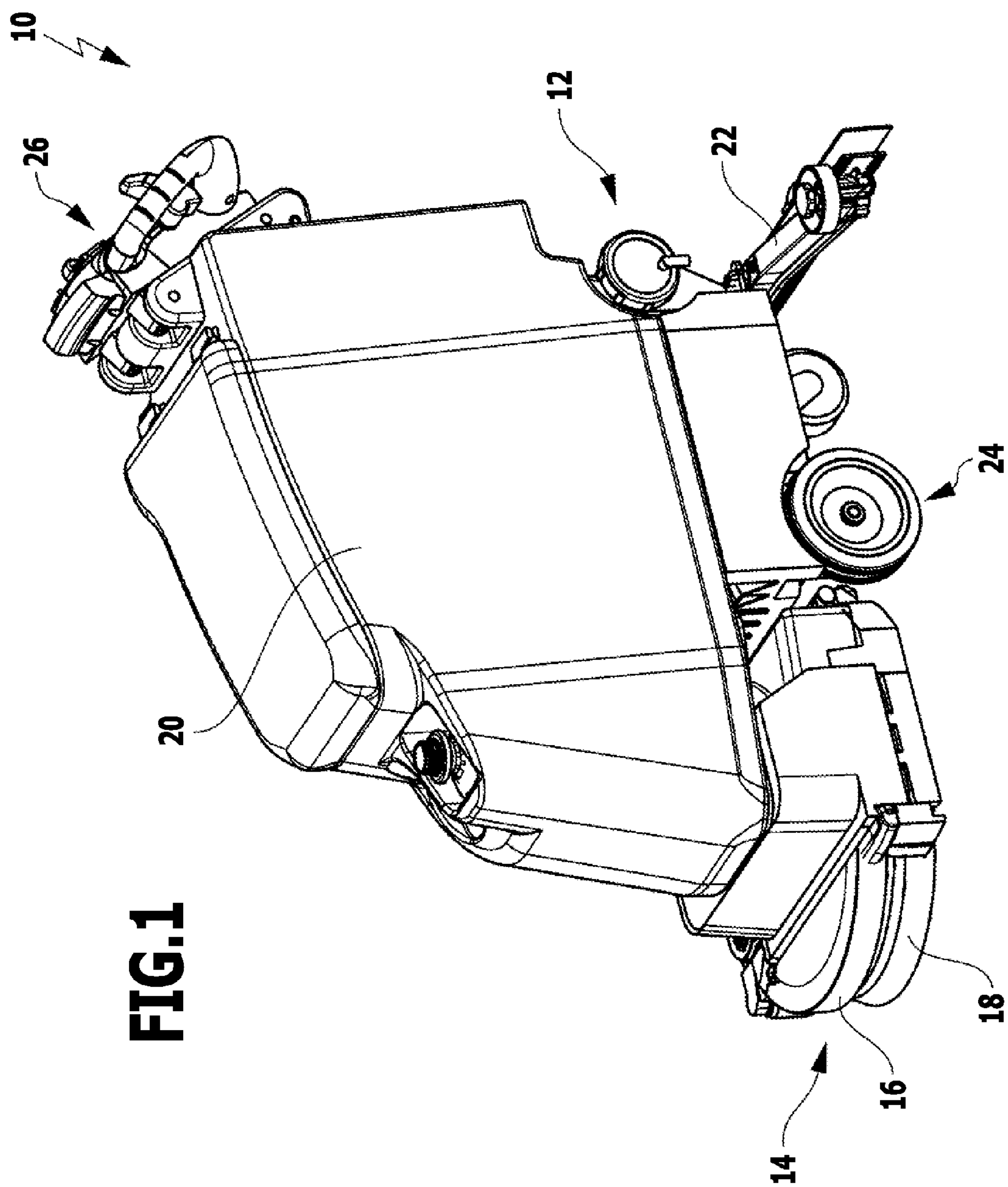
FIG. 1 is a perspective view of a cleaning apparatus in accordance with the invention.

A preferred embodiment of a cleaning apparatus in accordance with the invention is configured as a scrubber vacuum machine which is shown in the perspective view of FIG. 1 and designated therein by reference numeral 10. The scrubber vacuum machine 10 is what is known as a walk-behind machine, which is controlled from its rear side 12 by a user.

The scrubber vacuum machine 10 has at its front side 14 a cleaning tool 16 with a rotating disc brush 18 which is adapted to dislodge dirt from a floor surface to be cleaned. A cleaning liquid, preferably water, contained in a tank 20 of the scrubber vacuum machine 10 is applied to the surface to be cleaned in order to enhance the cleaning action.

The scrubber vacuum machine 10 comprises at its rear side 12 a dirt pickup device 22 for sucking up dislodged dirt and water from the floor surface.

The dirt pickup device 22 and the cleaning tool 16 are functional units of the scrubber vacuum machine 10. Apart from these, the scrubber vacuum machine 10 has another functional unit in the form of a drive which is known per se and not shown in the drawing, for a chassis 24 of the scrubber vacuum machine 10.

Figure 2:
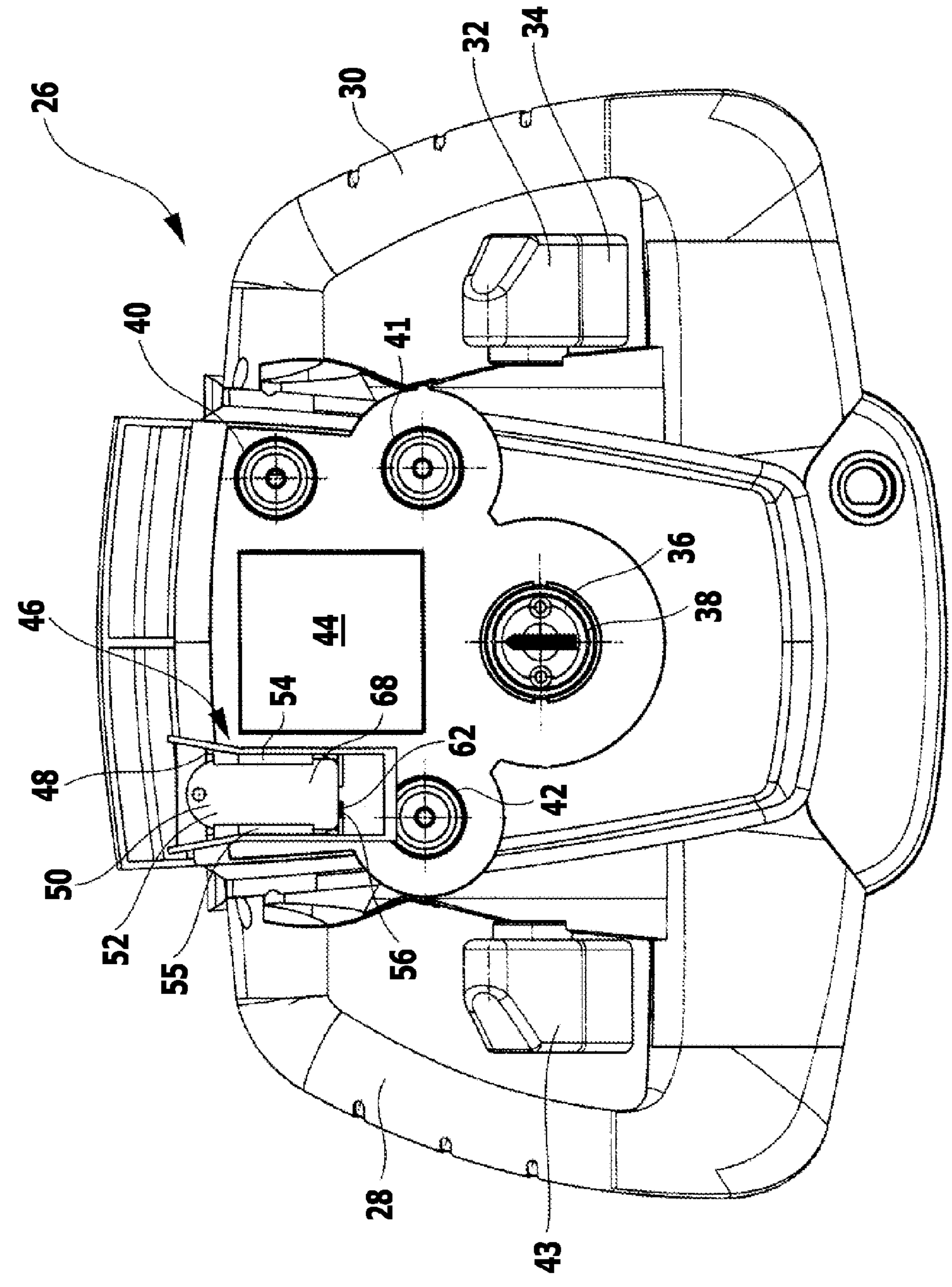
FIG. 2 is a top view of an operating unit of the cleaning apparatus shown in FIG. 1.

The scrubber vacuum machine 10 comprises an operating unit 26 arranged on the rear side 12 for receiving operating instructions. Said operating unit is shown in the top view of FIG. 2. It has a left handle 28 and a right handle 30 which serve to control the scrubber vacuum machine 10 and may also be used to push it.

Furthermore, the operating unit 26 comprises an actuating member 32 in the form of a toggle lever 34 which is operable by a user to preset the travel speed. Another actuating member 36 in the form of a programme selector switch 38 is operable by a user to preset a cleaning programme of the scrubber vacuum machine 10 which is tailored to the floor surface to be cleaned. Moreover, the operating unit 26 has additional actuating members 40, 41, 42 and 43 which will not be discussed in more detail in the following for receiving operating instructions from a user. Furthermore, the operating unit 26 comprises a display device 44 which is adapted to display information related to the state of the scrubber vacuum machine 10.

Arranged beside the display device 44 is a receptacle 46 in the form of an insertion slot 48. An authorization carrier 50 of the scrubber vacuum machine 10 can be removably arranged in the receptacle 46. The authorization carrier 50 is configured in the form of a credit card sized authorization card 52 which can be inserted into the insertion slot 48 and can be clamped therein by means of ledges 54 and 55 that engage over said authorization card. In this way, the ledges 54 and 55 define a securing device for the authorization card 52, securing the latter against accidentally falling out of the receptacle 46.

By means of a switch 56, in particular a microswitch, which is arranged on the receptacle 46, it is possible to detect whether or not the authorization card 52 is located in the receptacle 46. The switch 56 is electrically connected to a control unit 58 of the scrubber vacuum machine 10, said control unit 58 also being operatively connected to the cleaning tool 16, the dirt pickup device 22, the operating unit 26 and (although not shown in FIG. 3) to the drive of the scrubber vacuum machine 10.

Figure 3:
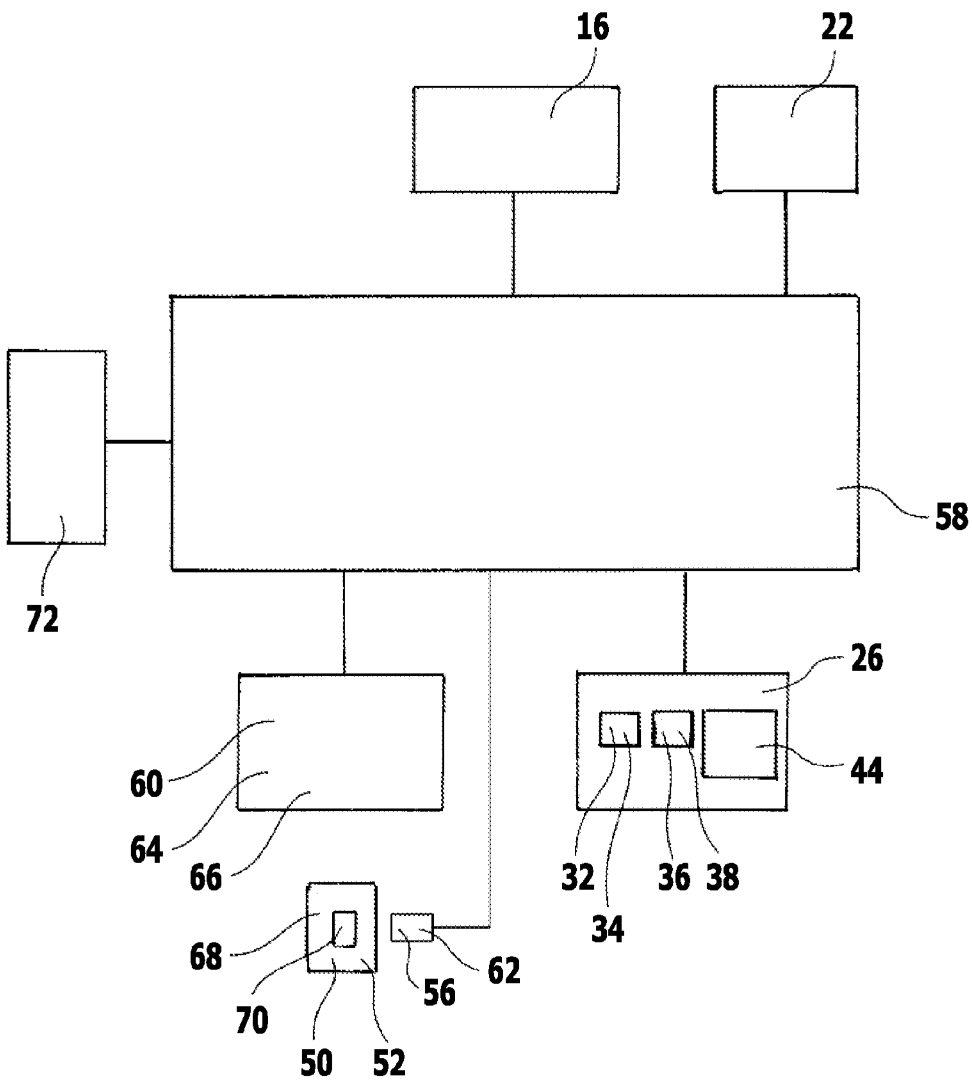
FIG. 3 is a block diagram of electrically effective components of the cleaning apparatus shown in FIG. 1.

The control unit 58 serves to receive operating instructions that are performed on the operating unit 26, in particular operating instructions that are performed on the actuating members 32 and 36 and 40 to 43, the actuating members 40 to 43 not being shown in FIG. 3. The control unit 58 can control the functional units of the scrubber vacuum machine 10 on the basis of said operating instructions.

With the authorization card 52 arranged in the receptacle 46, the switch 56 is actuated and transmits this information to the control unit 58, which then activates a detection unit 60 that is operatively connected thereto. Therefore, the switch 56 is also referred to as an activating member 62.

The detection unit 60 is arranged beneath a cover delimiting the operating unit 26 on the top side thereof and is within a distance of few centimeters of the receptacle 46. Physically, the detection unit 60 is thus integrated in the operating unit 26, wherein it may in particular be secured to the same carrier as for example the display device 44, in particular to the same circuit board.

The detection unit 60 is configured as a device for emitting and detecting electromagnetic radiation and forms in particular an RFID reading device 64. This RFID reading device 64 is further adapted to establish a data connection based on an NFC (near field communication) standard. Thus, the detection unit 60 also forms an NFC interface 66 of the scrubber vacuum machine 10.

The authorization card 52 is configured as an RFID-enabled passive transponder 68. It may be provided for said authorization card 52 to be likewise designed to form an NFC based data exchange connection.

If the detection unit 60 is activated with the authorization card 52 arranged in the receptacle 46, the detection unit 60 is capable of contactlessly detecting an access authorization that is stored in a storage member 70 of the authorization card 52, said access authorization being in the form of an identification code for the scrubber vacuum machine 10. The detection is based on an RFID technology using electromagnetic radiation which is emitted from the detection unit 60 and is modified on the basis of the access authorization stored in the storage member 70 such that this can be detected by the detection unit 60.

The access authorization detected by the detection unit 60 is transmitted to the control unit 58, which is operatively connected to a storage unit 72 of the scrubber vacuum machine 10 which stores information related to potential users of the scrubber vacuum machine 10. The control unit 58 then reads the storage unit 72 as to whether the access authorization stored on the authorization card 52 and detected by the detection unit 60 allows access to the scrubber vacuum machine 10. If this is the case, the user holding the authorization card 52 can be identified by the control unit 58 and can put the scrubber vacuum machine 10 into operation.

The storage unit 72 also stores, as a function of access authorizations stored therein, information related to the respective authorization level of the user and a respective operating profile of the user for the scrubber vacuum machine 10. After reading the storage unit 72, the control unit 58 thus allows the authorization level of the user holding the authorization card 52 to be identified. By way of example, one authorization level may be assigned to ordinary cleaning personnel and another authorization level may be assigned to service or maintenance personnel. Accordingly, provision may be made for the user to have no or only limited access to certain functions of the functional units of the scrubber vacuum machine 10.

Based on the operating profile, as read from the storage unit 72, of the user holding the authorization card 52, it is further possible for the control unit 58 to readjust settings that are individualized to the specific user before initiating cleaning operation. By way of example, status information related to the scrubber vacuum machine 10 may be displayed on the display device 44 in a language familiar to the user. It may, for example, also be provided for the cleaning tool 16 and the dirt pickup device 22 as well as the drive of the scrubber vacuum machine 10 to be adapted to the nature of the floor surface the identified user normally cleans.

It is possible for information associated with the access authorization and related to the user to be storable in the storage unit 72 so as to be modifiable. Thus, new "granted" access authorizations for operating the scrubber vacuum machine 10 may be added to the storage unit 72 or access authorizations stored in the storage unit 72 may be deleted therefrom. Similarly, the information associated with a stored access authorization and related to an authorization level and/or an operating profile of the user may be modifiable.

Likewise, the storage member 70 of the authorization card 52 may modifiably store information that is associated with the access authorization stored therein and is related to an authorization level and an operating profile of the user. This makes it possible for the authorization card 52 to be used with a plurality of scrubber vacuum machines that are identical in configuration to the scrubber vacuum machine 10, without the user having to adjust each of the scrubber vacuum machines separately for its operation. Instead, the information stored on the authorization card 52 can be read along with detecting the access authorization by means of the respective detection unit 60.

The possibility of contactlessly detecting, by means of the detection unit 60, the access authorization for the scrubber vacuum machine 10 stored on the authorization card 52 allows the scrubber vacuum machine 10 to be put into operation in a user-friendly manner. By additionally storing information associated with the access authorization, for example in the storage unit 72 or in the storage member 70, it is further possible to adapt the scrubber vacuum machine 10 to the user's authorization level and operating profile in a simple manner.

For maintenance of the scrubber vacuum machine 10, it may be provided that, once the access authorization has been successfully verified as positive by the control unit 58, a wireless data connection with an external communication device is established via the detection unit 60. This ensures that no maintenance work is allowed until the control unit 58 has ascertained, based on the access authorization stored on the authorization card 52, that the user is maintenance personnel.

The data connection between the detection unit 60 and the external communication device may be realized, for example, by means of an NFC standard via the NFC interface 66. It is also possible for the detection unit 60 to be able to communicate with additional transmission standards such as Bluetooth or WLAN. The last-mentioned standards are suitable where large data volumes are to be exchanged between the scrubber vacuum machine 10 and the communication device, as is for example the case when software required for operating the scrubber vacuum machine 10 is to be transferred thereto.

The invention claimed is:

1. Cleaning apparatus, comprising:

an operating unit for operating the cleaning apparatus, at least one functional unit for carrying out an operating instruction, and a control unit for receiving operating instructions performed on the operating unit and controlling the at least one functional unit based on said operating instructions, at least one access authorization, which is associated with a corresponding authorization level and stored on an authorization carrier, being required in order to operate the cleaning apparatus, wherein the cleaning apparatus, and a detection unit operatively connected to the control unit and configured for contactless detection of the access authorization and transmission thereof to the control unit, wherein:

the access authorization is verifiable for validity by the control unit, at least first and second authorization levels are provided, a first access authorization is associated with the first authorization level and a second access authorization is associated with the second authorization level, and the first authorization level is assigned for cleaning operations and the second authorization level is assigned at least for maintenance operations.

2. Cleaning apparatus in accordance with claim 1, wherein the cleaning apparatus comprises a storage unit which is operatively connected to the control unit and in which information associated with the access authorizations and related to at least one user is storable for associating one of the access authorizations with a specific user by the control unit.

3. Cleaning apparatus in accordance with claim 2, wherein information associated with the access authorizations and related to at least one of the at least first and second authorization levels and an operating profile of the at least one user for the cleaning apparatus is storable in the storage unit.

4. Cleaning apparatus in accordance with claim 1, wherein the detection unit comprises a device for detecting the access authorizations by electromagnetic radiation.

5. Cleaning apparatus in accordance with claim 4, wherein the device is configured as an RFID reading device.

6. Cleaning apparatus in accordance with claim 4, wherein the device forms an NFC interface.

7. Cleaning apparatus in accordance with claim 1, wherein the cleaning apparatus comprises at least one authorization carrier associated therewith and having the first or the second access authorization stored thereon.

8. Cleaning apparatus in accordance with claim 7, wherein the at least one authorization carrier is configured as a transponder.

9. Cleaning apparatus in accordance with claim 7, wherein the at least one authorization carrier has a storage member in which information associated with the first or the second access authorization and related to a specific user is storable.

10. Cleaning apparatus in accordance with claim 9, wherein information associated with the first or the second access authorization and related to at least one of the first or the second authorization level and an operating profile of the user for the cleaning apparatus is storable in the storage member.

11. Cleaning apparatus in accordance with claim 7, wherein the cleaning apparatus has a receptacle for the at least one authorization carrier.

12. Cleaning apparatus in accordance with claim 11, wherein the receptacle is arranged on the operating unit.

13. Cleaning apparatus in accordance with claim 1, wherein the cleaning apparatus comprises an activating member, the detection unit being activatable by actuating said activating member.

14. Cleaning apparatus in accordance with claim 13, wherein the activating member is actuatable by at least one authorization carrier associated with the cleaning apparatus.

15. Cleaning apparatus in accordance with claim 1, wherein the control unit comprises a timing member for time-dependent output of an activating signal to the detection unit.

16. Cleaning apparatus in accordance with claim 1, wherein each of the at least first and second authorization levels are graded such that at least the second authorization level includes all operations of the first operating level.

17. Method for controlling access to a cleaning apparatus, wherein the cleaning apparatus comprises an operating unit for operating the cleaning apparatus, at least one functional unit for carrying out an operating instruction, and a control unit for receiving operating instructions performed on the operating unit and controlling the at least one functional unit based on said operating instructions, and wherein at least one access authorization, which is associated with a corresponding authorization level and stored on an authorization carrier, is required in order to operate the cleaning apparatus, the method comprising:

- detecting, by a detection unit of the cleaning apparatus which is operatively connected to the control unit, the access authorization in a contactless manner,
- transmitting the access authorization to the control unit,
- verifying the access authorization for validity by said control unit,
- wherein:
  - at least first and second authorization levels are provided,
  - a first access authorization is associated with the first authorization level and a second access authorization is associated with the second authorization level, and
  - the first authorization level is assigned for cleaning operations and the second authorization level is assigned at least for maintenance operations.

18. Method in accordance with claim 17, wherein a storage unit operatively connected to the control unit is read, said storage unit storing information associated with the access authorizations and related to a specific user.

19. Method in accordance with claim 18, wherein said storage unit stores information associated with the access authorizations and related to at least one of the at least one first and second authorization levels and an operating profile of the user for the cleaning apparatus.

20. Method in accordance with claim 17, wherein the detection unit is activated by actuating an activating member of the cleaning apparatus.

21. Method in accordance with claim 20, wherein the activating member is actuated by the authorization carrier.

22. Method in accordance with claim 17, wherein the access authorizations stored on the authorization carrier are detected by a method based on an RFID technology.

23. Method in accordance with claim 17, wherein an NFC standard is used as the transmission standard between the detection unit and the authorization carrier.

24. Method in accordance with claim 17, wherein, following positive verification of the validity of the second access authorization related to the second authorization level, a data connection between the cleaning apparatus and an external communication device is allowed to be established as a function of the second access authorization for maintenance of the cleaning apparatus.

25. Method in accordance with claim 24, wherein the data connection between the cleaning apparatus and the communication device is established in a wireless manner using the detection unit.

26. Method in accordance with claim 17, wherein each of the at least first and second authorization levels are graded such that at least the second authorization level includes all operations of the first operating level.

* * * * *

UNITED STATES PATENT AND TRADEMARK OFFICE

CERTIFICATE OF CORRECTION

PATENT NO. : 8,823,487 B2
APPLICATION NO. : 13/330743
DATED : September 2, 2014
INVENTOR(S) : Duenne et al.

It is certified that error appears in the above-identified patent and that said Letters Patent is hereby corrected as shown below:

In the Claims:

Claim 1, Column 10, lines 18-19: “ate the cleaning apparatus, wherein the cleaning apparatus, and” should read -- ate the cleaning apparatus, and --

Signed and Sealed this
Eighteenth Day of November, 2014

Michelle K. Lee

Michelle K. Lee
*Deputy Director of the United States Patent and Trademark Office*